US012786575B2

(12) United States Patent
Gardiner et al.

(10) Patent No.: US 12,786,575 B2
(45) Date of Patent: Nov. 3, 2026

(54) COMPUTER VISION PROCESSING CIRCUITRY

(71) Applicant: Apple Inc., Cupertino, CA (US)

(72) Inventors: Shannon L Gardiner, Berkeley, CA (US); Chiraag Juvekar, San Carlos, CA (US); Amit Pratap Rane, Santa Clara, CA (US); Karan Sanghi, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 18/939,051

(22) Filed: Nov. 6, 2024

(65) Prior Publication Data

US 2025/0234098 A1 Jul. 17, 2025

Related U.S. Application Data

(60) Provisional application No. 63/621,665, filed on Jan. 17, 2024.

(51) Int. Cl.
*H04N 23/80* (2023.01)
*H04N 23/611* (2023.01)

(52) U.S. Cl.
CPC ........... *H04N 23/80* (2023.01); *H04N 23/611* (2023.01)

(58) Field of Classification Search
CPC .... G06F 1/3228; G06F 9/5094; G06F 1/3206; G06F 9/4893; G06F 9/4887; G06F 1/3293; G06F 1/329; G06F 1/3287; H04N 23/611; H04N 23/80
See application file for complete search history.

(56) References Cited

U.S. PATENT DOCUMENTS

| | | | | |
|---|---|---|---|---|
| 9,886,845 | B2 | 2/2018 | Rhoads et al. | |
| 10,839,856 | B2 * | 11/2020 | Beatch | H04N 21/23424 |
| 2010/0194920 | A1 * | 8/2010 | Gai | H04N 1/0044 348/222.1 |
| 2012/0218436 | A1 | 8/2012 | Rhoads et al. | |
| 2014/0368688 | A1 | 12/2014 | John Archibald et al. | |
| 2019/0313026 | A1 | 10/2019 | Cheng et al. | |
| 2021/0006706 | A1 * | 1/2021 | Koci | H04M 1/72412 |
| 2021/0125664 | A1 | 4/2021 | Holland et al. | |
| 2021/0368062 | A1 * | 11/2021 | Hirai | H04N 23/65 |
| 2024/0013493 | A1 | 1/2024 | Arya et al. | |

* cited by examiner

*Primary Examiner* — Xi Wang
(74) *Attorney, Agent, or Firm* — Treyz Law Group; Jason Tsai

(57) ABSTRACT

An electronic device is provided that can include sensors for capturing an image, computer vision processing (CVP) circuitry that receives the captured image and having subsystems operating in a first power domain, a back-end image signal processing pipeline operating in a second power domain different than the first power domain, and optionally displays configured to receive content for display from the back-end image signal processing pipeline. A multiclient scheduler in the CVP circuitry can receive and reorder image requests received from a plurality of client processors in the electronic device. The multiclient scheduler can query an image server on the electronic device to determine whether image requests can be satisfied by an existing image currently stored on the image server.

23 Claims, 7 Drawing Sheets

COMPUTER VISION PROCESSING CIRCUITRY

This application claims the benefit of U.S. Provisional Patent Application No. 63/621,665, filed Jan. 17, 2024, which is hereby incorporated by reference herein in its entirety.

FIELD

This disclosure relates generally to electronic devices and, more particularly, to electronic devices with transparent displays.

BACKGROUND

Some electronic devices include transparent displays that present images close to a user's eyes. The transparent displays permit viewing of a user's physical environment through the transparent display. For example, extended reality headsets may include transparent displays. Such electronic devices with transparent displays can include cameras for capturing an image of the surrounding environment. It is within this context that the embodiments herein arise.

SUMMARY

An aspect of the disclosure provides an electronic device that includes one or more sensors configured to capture an image, computer vision processing circuitry configured to receive the captured image and having a plurality of subsystems configured to operate in a first power domain, and a back-end image signal processing pipeline configured to operate in a second power domain different than the first power domain. The electronic device can optionally include one or more displays configured to receive content for display from the back-end image signal processing pipeline. The sensors can include one or more outward-facing cameras configured to capture an image of an environment and/or one or more inward-facing cameras configured to capture an image of an eye. The computer vision processing circuitry can be configured to output a processed image in accordance with first image processing requirements, whereas the back-end image signal processing pipeline can be configured to output a processed image in accordance with second image processing requirements different than the first image processing requirements. The back-end image signal processing pipeline can be selectively deactivated, such as when the one or more displays is not outputting content.

An aspect of the disclosure provides a method of operating an electronic device that includes: with multiple clients running on the electronic device, outputting image requests; with a multiclient scheduler, receiving the image requests from the clients and feeding the image requests into a queue; with the multiclient scheduler, reordering at least some of the image requests in the queue; and fulfilling at least some of the image requests in the queue by directing one or more image sensors in the electronic device to capture an image. A first of the clients can be configured to execute a first set of algorithms, whereas a second of the clients can be configured to execute a second set of algorithms different from the first set of algorithms. A first scheduling agent executed on the first client can be configured to manage first requests output from the first set of algorithms, whereas a second scheduling agent executed on the second client can be configured to manage second requests output from the second set of algorithms. The image requests can be reordered in the queue based on deadlines or timing requirements specified in the image requests, priority levels associated with the image requests, and/or whether the image requests are associated with a user-facing algorithm or a non-user-facing algorithm.

An aspect of the disclosure provides a method of operating an electronic device having one or more sensors. The method can include: running multiple clients on the electronic device; with a multiclient scheduler operable to communicate with the clients, receiving an image request from one of the clients; and determining whether the image request can be satisfied by an existing image currently stored on an image server within the electronic device before triggering the one or more sensors to capture a new image. The method can further include: returning a pointer to the existing image to the client in response to determining to that the image request can be satisfied by an existing image currently stored on the image server; and triggering the one or more sensors to capture a new image in response to determining to that the image request cannot be satisfied by an existing image currently stored on the image server. The image request can include requirements that specify one or more of: a timing or deadline requirement, an image resolution, an exposure level, a camera type, and a number of consecutive frames to capture.

DETAILED DESCRIPTION

Figure 1:
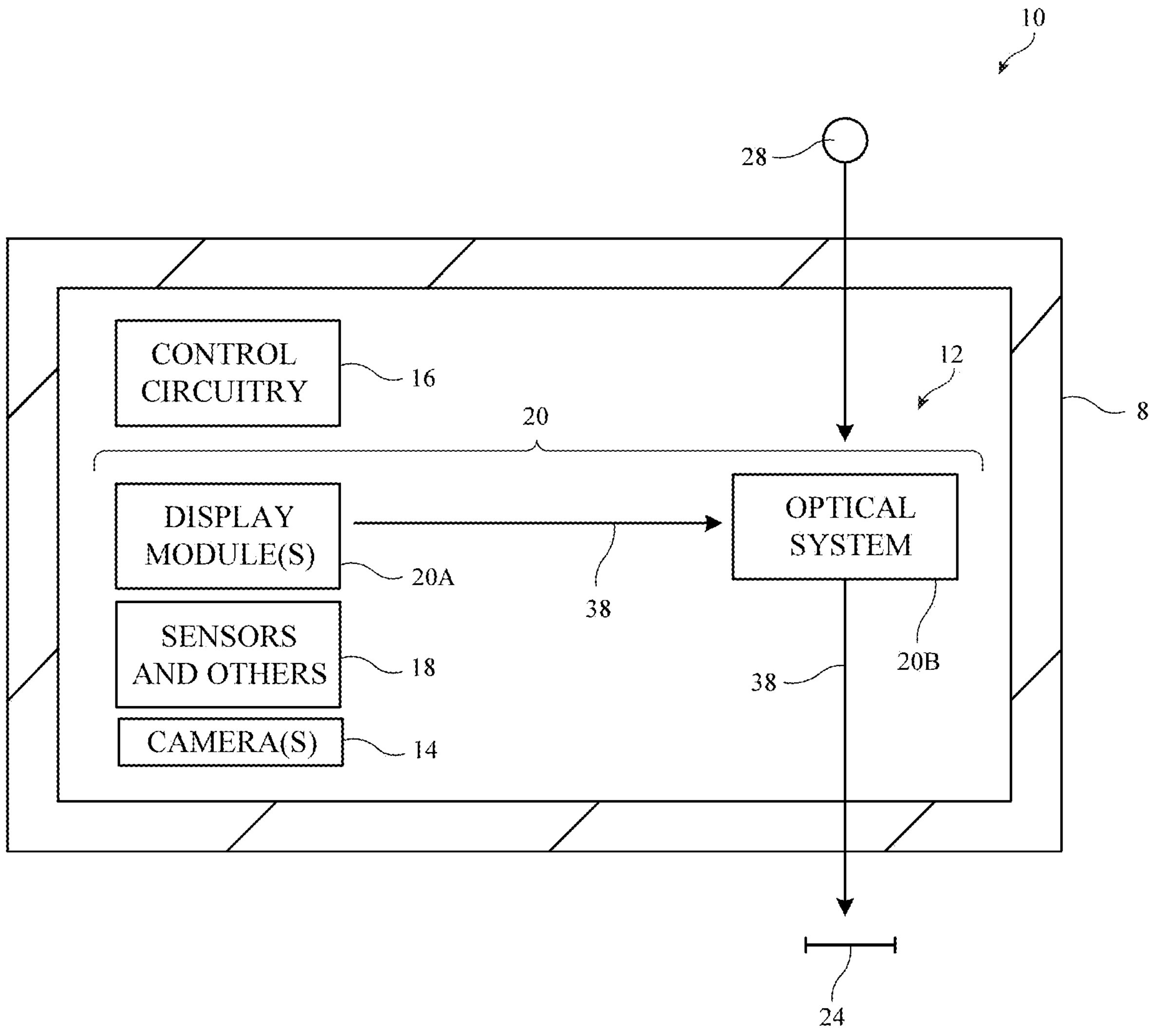
FIG. 1 is a diagram of an illustrative system having a transparent display in accordance with some embodiments.

A physical environment can refer to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell.

In contrast, an extended reality (XR) environment refers to a wholly or partially simulated environment that people sense and/or interact with via an electronic device. For example, an XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment.

Rather than an opaque display, a head mountable system may have a transparent or translucent display. The transparent or translucent display may have a medium through which light representative of images is directed to a person's eyes. The display may utilize digital light projection, organic light-emitting diodes (OLEDs), LEDs, micro light-emitting diodes (uLEDs), liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to selectively become opaque. Projection-based systems may employ retinal projection technology that projects graphical images onto a person's retina. Projection systems also may be configured to project virtual objects into the physical environment, for example, as a hologram or on a physical surface.

System 10 (sometimes referred to as electronic device 10, head-mounted device 10, etc.) of FIG. 1 may be a head-mounted device having one or more displays. The displays in system 10 may include displays 20 (sometimes referred to as near-eye displays) mounted within support structure (housing) 8. Support structure 8 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B. Displays 20 are optional and can be omitted from device 10.

The operation of system 10 may be controlled using control circuitry 16. Control circuitry 16 may be configured to perform operations in system 10 using hardware (e.g., dedicated hardware or circuitry), firmware and/or software. Software code for performing operations in system 10 and other data is stored on non-transitory computer readable storage media (e.g., tangible computer readable storage media) in control circuitry 16. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16. The processing circuitry may include application-specific integrated circuits with processing circuitry, one or more microprocessors, digital signal processors, graphics processing units, a central processing unit (CPU) or other processing circuitry.

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include one or more cameras 14 (sometimes referred to as image sensors 14). Cameras 14 may be used for gathering images of physical objects that are optionally digitally merged with virtual objects on a display in system 10. Input-output devices 12 may include sensors and other components 18 (e.g., accelerometers, gyroscopes, depth sensors, light sensors, haptic output devices, speakers, batteries, wireless communications circuits for communicating between system 10 and external electronic equipment, etc.).

Cameras 14 that are mounted on a front face of system 10 and that face outwardly (towards the front of system 10 and away from the user) may sometimes be referred to herein as outward-facing, external-facing, forward-facing, or front-facing cameras. Cameras 14 may capture visual odometry information, image information that is processed to locate objects in the user's field of view (e.g., so that virtual content can be registered appropriately relative to real-world objects), image content that is displayed in real time for a user of system 10, and/or other suitable image data. For example, outward-facing cameras may allow system 10 to monitor movement of the system 10 relative to the environment surrounding system 10 (e.g., the cameras may be used in forming a visual odometry system or part of a visual inertial odometry system). Outward-facing cameras may also be used to capture images of the environment that are displayed to a user of the system 10. If desired, images from multiple outward-facing cameras may be merged with each other and/or outward-facing camera content can be merged with computer-generated content for a user.

Display modules 20A may be liquid crystal displays, organic light-emitting diode displays, laser-based displays, or displays of other types. Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 20B may be selected so that any gap present between the displays will not be visible to a user (e.g., so that the images of the left and right displays overlap or merge seamlessly).

If desired, optical system 20B may contain a transparent structure (e.g., an optical combiner, etc.) that allows image light from physical objects 28 to be combined optically with virtual (computer-generated) images such as virtual images in image light 38. Light from physical objects 28 in the physical environment or scene can sometimes be referred to and defined herein as world light, scene light, ambient light, external light, or environmental light. In this type of system, a user of system 10 may view both the physical environment around the user and computer-generated content that is overlaid on top of the physical environment. Cameras 14 may also be used in device 10 (e.g., in an arrangement in which a camera captures images of physical object 28 and this content is modified and presented as virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
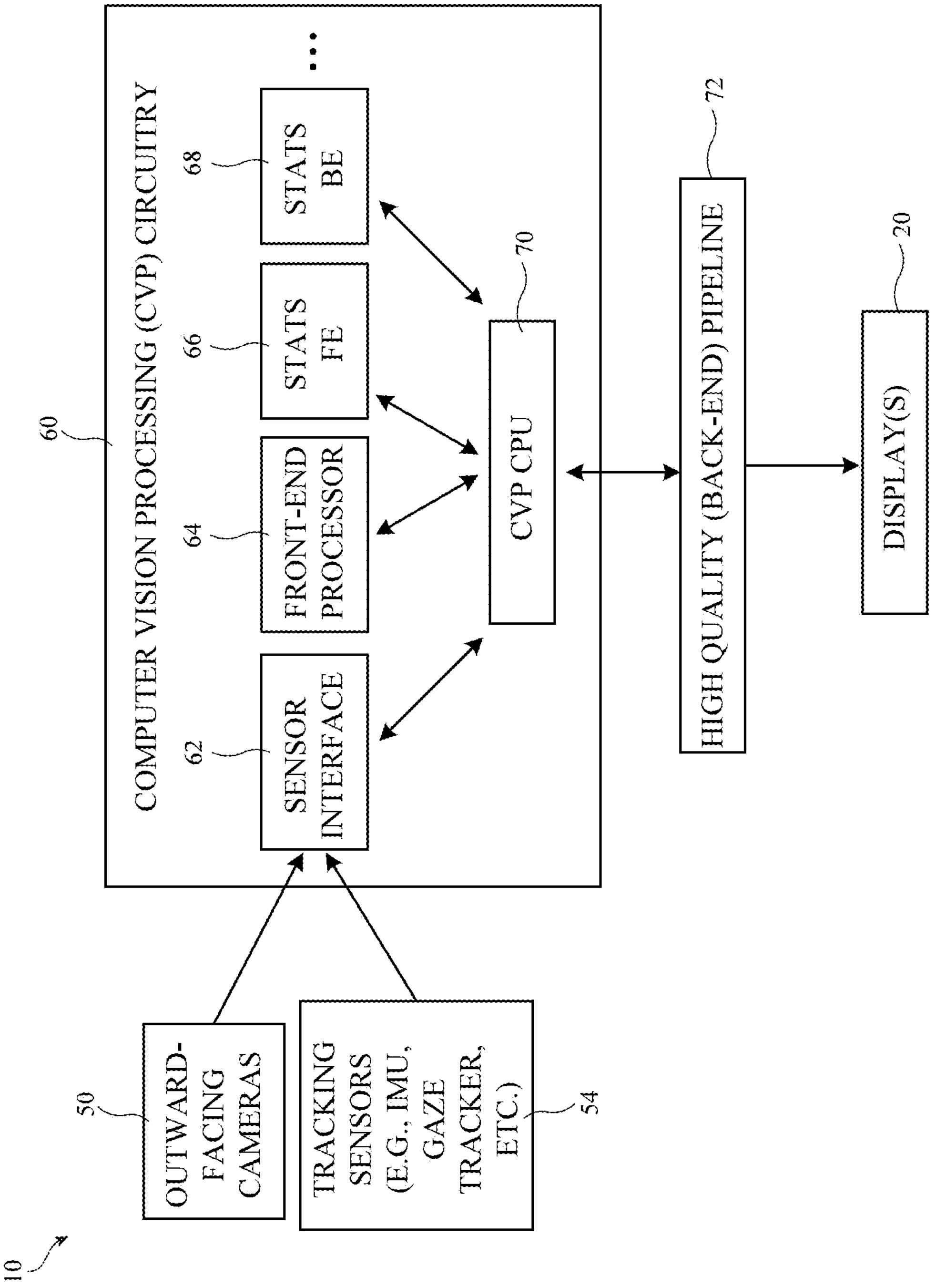
FIG. 2 is a diagram showing illustrative hardware components that can be included within a system of the type shown in FIG. 1 in accordance with some embodiments.

FIG. 2 is a diagram showing illustrative hardware components that can be included within a system (e.g., device 10) of the type described in connection with FIG. 1. As shown in FIG. 2, device 10 can include one or more hardware and/or software subsystems, including one or more outward-facing image sensing subsystems such as outward-facing cameras 50, one or more tracking subsystems such as tracking sensors 54, computer vision processing (CVP) circuitry such as CVP circuitry 60, a separate image signal processing pipeline such as high quality (back-end) pipeline 72, and one or more display(s) 20.

One or more cameras 50 can be used to gather information on the external real-world environment or scene surrounding device 10. Cameras 50 may include one or more of front-facing cameras 14 in FIG. 1. At least some of cameras 50 can be configured to capture a series of images of a scene, which can be presented as a live video passthrough feed to the user using displays 20. The live video passthrough feed is sometimes referred to as passthrough content. Such front-facing cameras that are employed to acquire passthrough content are sometimes referred to as scene or passthrough cameras. Cameras 50 may include color image sensors and/or optionally monochrome (black and white) image sensors.

Cameras 50 can have different fields of view. Some cameras 50 can have a wide or ultrawide field of view, whereas some cameras 50 can have relatively narrower field of view. Not all of cameras 50 need to be used for capturing passthrough content. Some of the cameras 50 may be forward facing (e.g., oriented towards the scene in front of the user); some of the cameras 50 may be downward facing (e.g., oriented towards the user's torso, hands, or other parts of the user); some of the cameras 50 may be side/lateral facing (e.g., oriented towards the left and right sides of the user); and some of the cameras 50 can be oriented in other directions relative to the front face of device 10. All of these cameras 50 that are configured to gather information on the external physical environment surrounding device 10 are sometimes referred to and defined collectively as "external-facing" or "outward-facing" cameras.

Tracking sensors 54 can include a gaze tracking subsystem, sometime referred to as a gaze tracker, that is configured to gather gaze information or point-of-gaze information. The gaze tracker may employ one or more "inward-facing" camera(s) and/or other gaze-tracking components (e.g., eye-facing components and/or other light sources that emit beams of light so that reflections of the beams from a user's eyes may be detected) to monitor the user's eyes. One or more gaze-tracking sensor(s) 54 may face a user's eyes and may track a user's gaze. A camera in a gaze-tracking subsystem may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Gaze tracking cameras may sometimes be referred to as inward-facing cameras, gaze-detection cameras, eye-tracking cameras, gaze-tracking cameras, or eye-monitoring cameras. If desired, other types of optical sensors (e.g., infrared and/or visible light-emitting diodes and light detectors, etc.) may also be used in monitoring a user's gaze.

Tracking sensors 54 can also include a face and body tracking subsystem configured to perform face tracking (e.g., to capture images of the user's jaw, mouth, etc. while the device is worn on the head of the user) and body tracking (e.g., by capturing images of the user's torso, arms, hands, legs, etc. while the device is worn on the head of user). If desired, the face and body tracking subsystem can also track a user's head pose by directly determining any movement, yaw, pitch, roll, etc. for head-mounted device 10. The yaw, roll, and pitch of the user's head may collectively define a user's "head pose." For example, tracking sensors 54 can include an inertial measurement unit (IMU). The inertial measurement unit can include one or more gyroscopes, gyrocompasses, accelerometers, magnetometers, other inertial sensors, and other position and motion sensors. These position and motion sensors may assume that head-mounted device 10 is mounted on the user's head. Therefore, references herein to head pose, head movement, yaw of the user's head (e.g., rotation around a vertical axis), pitch of the user's head (e.g., rotation around a side-to-side axis), roll of the user's head (e.g., rotation around a front-to-back axis), etc. may be considered interchangeable with references to device pose, device movement, yaw of the device, pitch of the device, roll of the device, etc. In certain embodiments, tracking sensors 54 may also include six degrees of freedom (DoF) tracking subsystems. Six DoF tracking subsystems or sensors can be used to monitor both rotational movement such as roll, pitch, and yaw and also positional/translational movement in a 3D environment.

Tracking sensors 54 can optionally further include a hands tracking subsystem, sometimes referred to as a hands tracker, configured to monitor a user's hand motion/gesture to obtain hand gestures data. For example, the hands tracker may include a camera and/or other gestures tracking components (e.g., outward facing components and/or light sources that emit beams of light so that reflections of the beams from a user's hand may be detected) to monitor the user's hand(s). One or more hands-tracking sensor(s) may be directed towards a user's hands and may track the motion associated with the user's hand(s), may determine whether the user is performing a tapping or swiping motion with his/her fingertips or hand(s), may determine whether the user is performing a non-contact button press or object selection operation with his/her hand(s), may determine whether the user is performing a grabbing or gripping motion with his/her hand(s), may determine whether the user is pointing at or pinching at a given object that is presented on display 20 using his/her hand(s) or fingers, may determine whether the user is performing a waving or bumping motion with his/her hand(s), or may generally measure/monitor three-dimensional non-contact gestures ("air gestures") associated with the user's hand(s). Tracking sensors 54 operable to obtain gaze, pose, hands gesture, and other information relating to a motion of a user of device 10 are sometimes referred to collectively as "user-tracking" sensors.

The example of FIG. 2 in which outward-facing cameras 50 and tracking sensors 54 (e.g., optical sensors employed to obtain gaze, pose, and/or other user-related data) are shown as separate independent subsystems is illustrative. In some embodiments, one or more of external-facing cameras 50 can also be employed to obtain pose information, location information, and/or other motion/position information associated with device 10. To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

Electronic device 10 can be configured to gather contextual information of the surrounding real-world (physical) environment or scene. Gathering contextual information can, for example, include identifying one or more objects of interest in the environment, detecting when the user has entered a particular room or environment, detecting when the user is engaging in a particular activity, detecting a current location of device 10, detecting a current user context or usage scenario (e.g., detecting if the user is currently watching a movie, playing a video game, or talking to another person or avatar), and/or determining other contextual information relating to the operation of device 10. Gathering contextual information may involve capturing one or more images using outward-facing cameras 50 and/or obtaining data from tracking sensors 54. Such images being captured for contextual purposes need not be output by displays 20 for human consumption. As such, the processing requirements and complexity for handling such images may be less than traditional image signal processing steps required for processing images that are being output by the displays for human consumption (viewing).

In accordance with an embodiment, image signal processing circuitry on device 10 can be segmented into a first portion that includes computer vision processing (CVP) circuitry 60 and a separate second portion that includes high quality (HQ) pipeline 72. Images and/or data output from sensors 50 and 54 that only need to be analyzed for contextual purposes may be processed using only CVP circuitry 60 (without being processed by the high quality pipeline 72), whereas images and/or data output from sensors 50 and 54 that will be output on displays 20 for human viewing may be processed by CVP circuitry 60 and high quality pipeline 72. Components within CVP circuitry 60 may be operated in a first power domain, whereas components within HQ pipeline 72 may be operated in a second power domain different from the first power domain (e.g., CVP circuitry 60 and HQ pipeline 72 may be configured to operate in different power domains).

Components in CVP circuitry 60 may generally operate in a lower power domain relative to the components in HQ pipeline 72. High quality pipeline 72 may be power gated. When processing images to be output on displays 20 for human consumption, high quality pipeline 72 may be selectively activated (e.g., powered on) to perform some or all of the image processing functions provided by HQ pipeline 72. When processing images for only contextual purposes (e.g., to support one or more computer vision algorithms running on device 10) without having to display such images, HQ pipeline 72 can be selectively deactivated (e.g., powered off or idled) to conserve power. In other words, CVP circuitry 60, when activated, consumes a first amount of power, whereas HQ pipeline 72, when activated, consumes a second amount of power greater than the first amount of power. Operating the image signal processing circuitry on device 10 in this way can be technically advantageous to minimize power consumption on device 10. This can be beneficial for small, lightweight device 10 that might be powered by a battery for all-day usage.

As shown in FIG. 2, CVP circuitry 60 may include one or more hardware and/or software subsystems such as a sensor interface 62, a front-end (FE) processor 64, a statistics front-end (FE) processor 66, a statistics back-end (BE) processor 68, a central processing unit (CPU) such as computer vision processing (CVP) CPU 70, and/or other image signal processing components. Sensor interface 62 can be configured to receive images (e.g., raw pixel data) from cameras 50, tracking sensors 54, and/or other image sensors within device 10. Front-end processor 64 can be configured to perform bad/defective pixel correction, image scaling or binning operations, image cropping or resizing, and/or other front-end or image pre-processing operations. Statistics FE processor 66 may be configured to collect pixel statistical information such as minimum pixel values, maximum pixel values, average pixel values, color plane information (e.g., red, green, and blue color planes), color and/or brightness histograms, and other front-end image statistics. Statistics BE processor 68 may be configured to convert an image from the raw Bayer domain to a color image and can generate additional statistical information.

The color image output from statistics BE processor 68 may be provided to one or more downstream computer vision processing algorithms or tasks running on device 10 (e.g., processor 68 may output an image to one or more client processors). Statistics FE processor 66 and BE processor 68 may be referred to collectively as a CVP statistics pipeline. Although CVP circuitry 60 is shown as including a single instance of interface 62, processor 64, processor 66, and processor 68, CVP circuitry 60 can include multiple sensor interface blocks 62 for interfacing with multiple sensors, multiple front-end processors 64 for performing image pre-processing operations in parallel, multiple processors 66 for performing front-end statistical computations in parallel, and multiple processors 68 for performing back-end statistical computations in parallel. Computer vision processing CPU 70 can be configured to manage and coordinate the operations of blocks 62, 64, 66, and 68 for processing each incoming image frame.

Computer vision processing circuitry 60 primarily includes components for performing front-end image signal processing operations. Computer vision processing circuitry 60 is therefore sometimes referred to as "front-end" image signal processing (ISP) circuitry. In contrast, HQ pipeline 72 primary includes components configured to perform back-end image signal processing operations. High quality pipeline 72 is therefore sometimes referred to as "back-end" image signal processing (ISP) circuitry. High quality (back-end) pipeline 72 may be a more complex and higher-power-consuming version of the statistics back-end processor 68 of CVP circuitry 60. For example, HQ pipeline 72 may include components configured to perform bad/defective pixel correction, noise reduction, white balancing, demosaicing, color space conversion, tone mapping (e.g., including global and local tone mapping), color correction, gamma correction, shading correction, image sharpening, high dynamic range (HDR) correction, edge-aware local image adjustments, image fusion (e.g., fusing multiple image frames together for noise reduction and high dynamic range), image signal processing operations entirely absent from CVP circuitry 60, and/or other image signal processing functions to output a corresponding image for display.

Image(s) output by the back-end processor 68 of CVP circuitry 60 may be processed in accordance with a first set of image processing requirements that can optionally produce a lower fidelity (quality) image for computer vision consumption, whereas image(s) output by the HQ pipeline 72 may be processed in accordance with a second set of image processing requirements different than the first set of image processing requirements that can optionally produce a comparatively higher fidelity (quality) image to be displayed for human consumption. In some embodiments, the CVP circuitry 60 can be configured to output a processed image having a first quality and/or using a first amount of power, whereas HQ pipeline 72 can be configured to output a processed image having a second quality greater than the first quality and/or using a second amount of power greater than the first amount of power. In some embodiments, CVP circuitry 60 can be configured to output a processed image by performing a first set of image processing operations, whereas HQ pipeline 72 can be configured to output a processed image by performing additional image processing operations different than the first set of image processing operations. Images output by processor 68 can be provided as results to one or more client processors (see, e.g., FIG. 3). The example of FIG. 2 in which HQ pipeline 72 can output content for human consumption via display(s) 20 is illustrative. Display 20 is optional and can be omitted from device 10. If desired, the content output from HQ pipeline 72 can be stored in memory for later processing.

Figure 3:
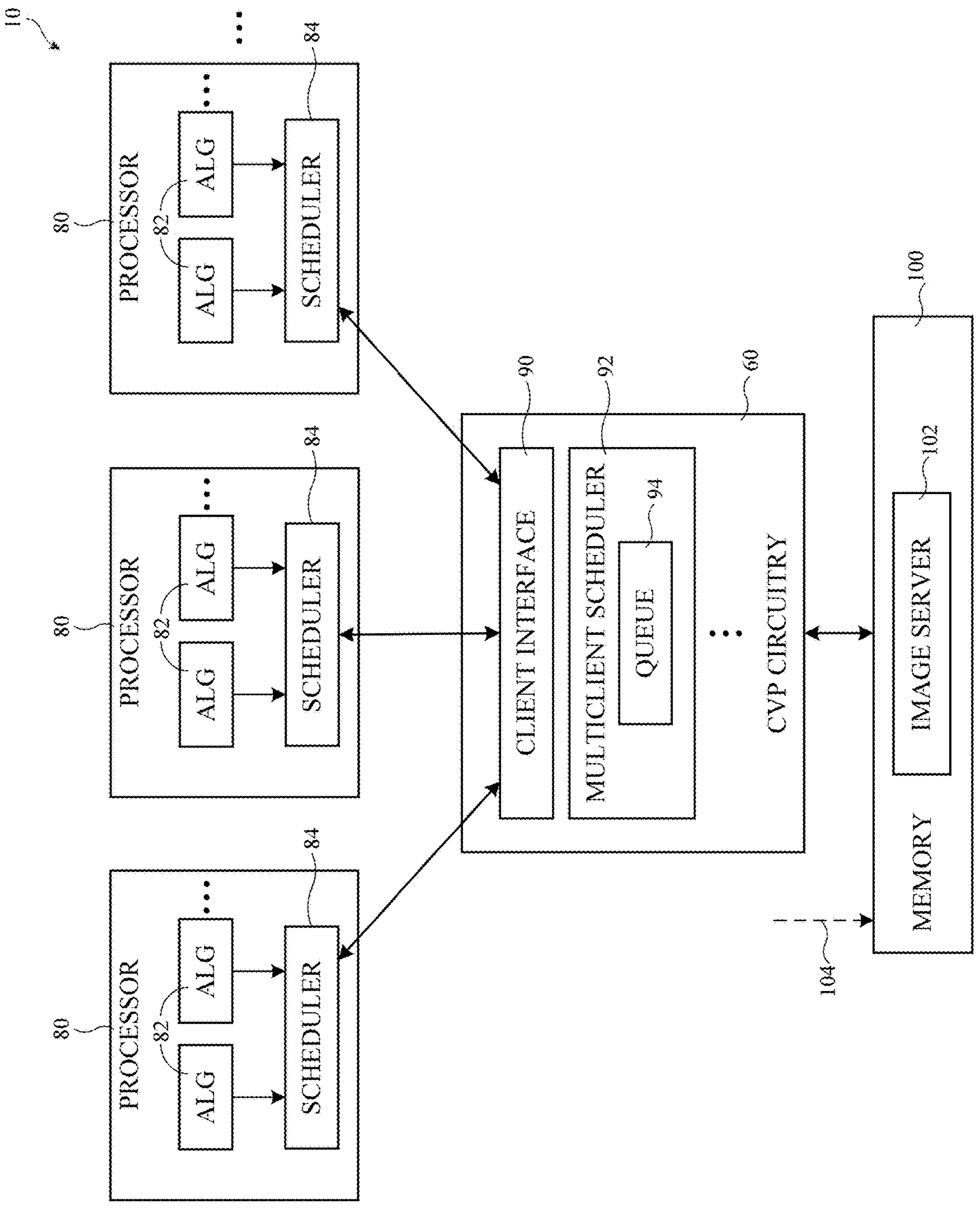
FIG. 3 is a diagram showing illustrative computer vision processing (CVP) circuitry coupled to multiple processors (clients) in accordance with some embodiments.

FIG. 3 shows how computer vision processing circuitry 60 may be further coupled to one or more processors 80 within device 10. As shown in FIG. 3, CVP circuitry 60 may be coupled to at least three different processor 80 within device 10. This is illustrative. In general, CVP circuitry 60 may be coupled to two or more processors 80, to three or more processors 80, to four or more processors 80, or to any suitable number of processors 80 within device 10. The various processors 80 being coupled to CVP circuitry 60 can have different computing capabilities and different power requirements. At least one of the processors 80 may serve as the main processor (sometimes referred to as the application processor), which generally has a more complex software stack and consumes more power than the other processors 80. The application processor may be responsible for driving displays 20. The other processors 80 may be provided with a simpler software stack and may consume less power than the main (application) processor. Since the application processor consumes more power, CVP circuitry 60 may be configured to only wake up the application processor when necessarily.

Each processor 80 can be configured to run or execute one or more algorithms 82. At least some of algorithms 82 can be computer vision processing algorithms. As an example, one of the low-power processors 80 may be configured to perform gaze detection by running a gaze detection algorithm 82. As another example, one of the low-power processors 80 may be configured to run a contextual vision processing algorithm 82 for detecting certain objects of interest within the environment. As another example, one of the low-power processors 80 may be configured to run a contextual vision processing algorithm 82 for determining whether the user is in a particular room or type of environment. As another example, one of the low-power processors 80 may be configured to run a contextual vision processing algorithm 82 for detecting whether the user is engaged in a certain type of activity (e.g., to detect when the user is exercising, walking, sleep, eating, etc.). As yet another example, one of the low-power processors 80 may be configured to run networking algorithms 82.

The various algorithms 82 can generate requests to complete certain tasks or jobs such as a request for a sensor to capture one or more images. In accordance with some embodiments, each processor 80 may be provided with a local intelligent scheduler 84 that is configured to determine a more insightful schedule for the performance of time-sensitive tasks and jobs that are being requested by algorithms 82 on that processor 80. Scheduler 84, sometimes referred to herein as a scheduling agent or an algorithms scheduler, may receive time-sensitive tasks from one or more algorithms 82 on the same processor 80 and output an optimized schedule for the requested tasks. Scheduler 84 can be considered to reside in an application (or user) layer. The application layer can refer to a classification of programs that execute in a mode with restricted privileges. In such a mode, a program may be barred from executing particular instruction set architecture defined instructions.

Figure 4:
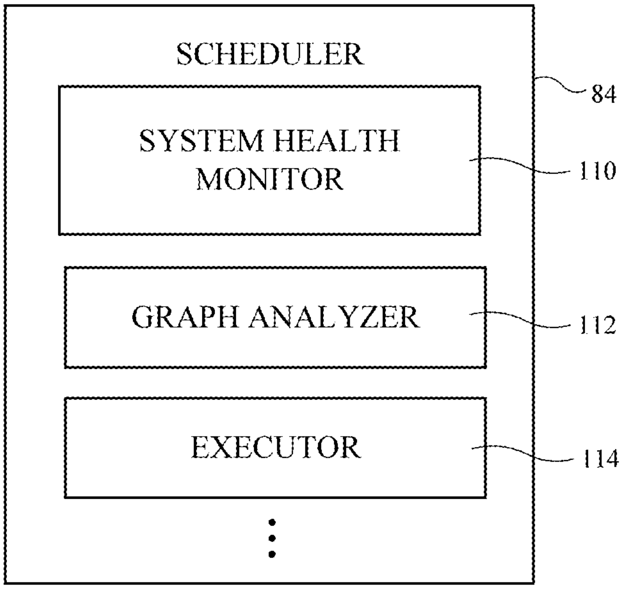
FIG. 4 is a diagram of an illustrative scheduling agent that can be executed on a processor in accordance with some embodiments.

FIG. 4 shows how scheduler 84 may include a system health monitor 110, a graph analyzer 112, and an executor 114. System health monitor 110 may be configured to monitor ongoing variations in the power, performance, and thermal statistics of device 10 to proactively determine the system's current health level, which can then be used by scheduler 84 to determine what resources are currently available for performing the time-sensitive tasks and to schedule the time-sensitive tasks accordingly. Scheduler 84 may proactively revise its schedule as the system health changes over time. For example, if scheduler 84 determines from the health information that it will no longer be able to satisfy particular timing constraints in the near future, scheduler 84 may contact the algorithms requesting the associated time-sensitive tasks and allow them to decide how to handle the device's declining health before device 10 reaches some problematic threshold.

Figure 5:
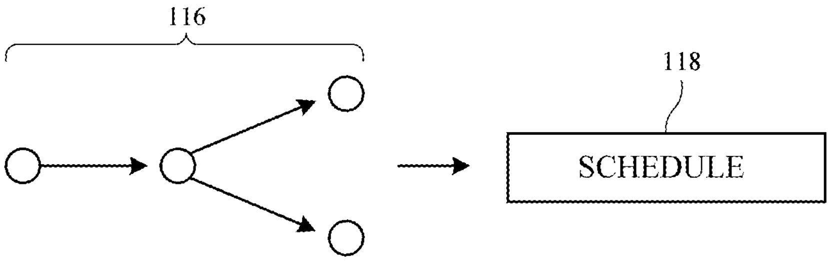
FIG. 5 a diagram of an illustrative relationship compute graph in accordance with some embodiments.

Graph analyzer 112 may take a holistic view of the time-sensitive tasks being requested by analyzing the current health level output from system health monitor 110, a compute graph, and other metadata in order to generate a suitable schedule for the time-sensitive tasks. FIG. 5 shows an illustrative relationship compute graph 116 identifying the interrelationship of tasks to be performed by algorithms 82. Such a compute graph 116 may include, for a given requested time-sensitive task, a graph node that specifies the time-sensitive tasks providing the inputs to be used in the performance of the given time-sensitive task and the time-sensitive tasks that should receive the outputs of the given task once it completes. The compute graph 116 may also include additional information such as the resources needed for the performance of the time-sensitive tasks, timing constraints associated with the time-sensitive tasks, the interrelationship of different tasks, etc. Based on this information, scheduler 84 may determine a corresponding schedule 118 indicating how the time-sensitive tasks should be implemented to improve performance and optimize resource usage. Scheduler 84 is therefore sometimes also referred to as a resource manager. In some embodiments, scheduler 84 can focus on identifying a critical path in the performance of a set of time-sensitive tasks and attempt to schedule tasks along this critical path in a manner that satisfies the timing constraints of the time-sensitive tasks. Executor 114 may consume or execute the schedule 118 determined by graph analyzer 112.

Configured in this way, scheduler 84 may serve as a processor-level or client-level gating agent that determines whether a request received from an algorithm 82 should be forwarded to the CVP circuitry 60. Scheduler 84 may decide not to pass on the received request to the CVP circuitry 60 if it determines that the request can be handled locally (e.g., by retrieving an image that has already or recently been captured). In some embodiments, scheduler 84 can allocate a set of credits among the various algorithms 82 running on a given processor 80. The amount of credits being allocated to each algorithm 82 by scheduler 84 determines the number of requests that can be made by each algorithm 82. For example, a first algorithm 82 can be allocated a first number of credits; a second algorithm 82 can be allocated a second number of credits different than the first number of credits; a third algorithm 82 can be allocated a third number of credits different than the first and second number of credits; and so on. Such credits can be used to manage shared access to a bounded pool of memory, ensuring no single client exceeds an allotted amount of memory. Scheduler 84 can thus provide a processor-level arbitration between requests issued from the various algorithms 82.

Each processor 80 can independently output one or more requests for performing time-sensitive tasks to CVP circuitry 60. For example, scheduler 84 in each processor 80 may output one or more requests to a client interface 90 of CVP circuitry 60. Client interface 90 may be configured to communicate with or receive requests from multiple scheduling agents 84 in the plurality of processors 80. The various processors 80 for independently sending requests to the client interface 90 of CVP circuitry 60 are therefore sometimes referred to as "clients," client processors, or client subsystems. The requests that are received from the various clients are therefore sometimes referred to as client requests. The example of FIG. 3 in which each client is implemented as a separate processing unit is illustrative. In some embodiments, more than one client can be implemented on a single processor. If desired, multiple clients and the CVP circuitry 60 can optionally be implemented as part of a single processor or system on chip within device 10. In other embodiments, at least some of the multiple clients can optionally be implemented as part of one or more processors or system on chip within another electronic device separate from device 10.

Computer vision processing circuitry 60 can include a multiclient scheduling subsystem such as multiclient scheduler 92 configured to arbitrate requests received from the various client processors 80. In other words, a "multiclient" scheduler can refer to and be defined herein as a scheduling agent configured to receive requests from multiple clients running on device 10 or running on multiple electronic devices 10. Multiclient scheduler 92 is therefore sometimes referred to as a multiclient arbitration block. Multiclient scheduler 92 may be part the computer vision processing CPU 70 shown in FIG. 2. Multiclient scheduler 92 may push received client requests into a queue 94, sometimes referred to as a multiclient scheduler queue. Multiclient scheduler 92 may be responsible for setting up tasks or jobs corresponding to client requests received from different processors 80. Multiclient scheduler 92 can optionally consolidate hardware usage between two separate requests. For example, two independent client image capture requests for an outward-facing camera 50 with a wide field of view (FoV) with different image resolution requirements might be fulfilled by a single image capture at the higher resolution requirement and then subsequently scaled down to satisfy the other request with the lower resolution requirement.

Multiclient scheduler 92 may also be configured to optimize for power savings. For example, scheduler 92 might power off a sensor if there are no upcoming requests in queue 94 for that sensor. As another example, scheduler 92 may temporarily instruct the CVP circuitry 60 to go to sleep if there are no client requests in queue 94 in an upcoming number of milliseconds (e.g., if queue 94 is empty or if there are no requests with a deadline that needs to be met within the next 10 milliseconds, within the next 1-10 milliseconds, within the next 10-100 milliseconds, etc.). Scheduler 92 can be configured to wake up CVP circuitry 60 in response to receiving a new client request. As another example, scheduler 92 can optionally treat streaming requests as periodically scheduled one-shot image captures. As another example, scheduler 92 can reuse a sensor for different captures for a low frame rate streaming request (e.g., for 1 Hz streaming requests, for 2 Hz streaming requests, for 1-5 Hz streaming requests, etc.).

Images captured based on client requests received at CVP circuitry 60 may be stored on memory 100. Memory 100 may be volatile memory (e.g., dynamic or static random-access-memory), nonvolatile memory (e.g., flash memory or other electrically-programmable-read-only memory configured to form a solid state drive), or other types of storage devices. The captured images that are stored on memory 100 may be organized as part of an image server such as image server 102, which represents a database of recently captured images or historical images. Older images (e.g., images captured more than a minute ago, more than ten minutes ago, more than an hour ago, more than a day ago, or images captured when the user was in the different location or when the user was engaged in a different activity) might no longer be relevant and can optionally be deleted from the image server 102. Each client processor 80 can also directly retrieve an image from image server 102 (e.g., via data path 104). Memory 100 that is accessible to CVP circuitry 60 and each client processor 80 can thus sometimes be referred to as shared memory.

Figure 6:
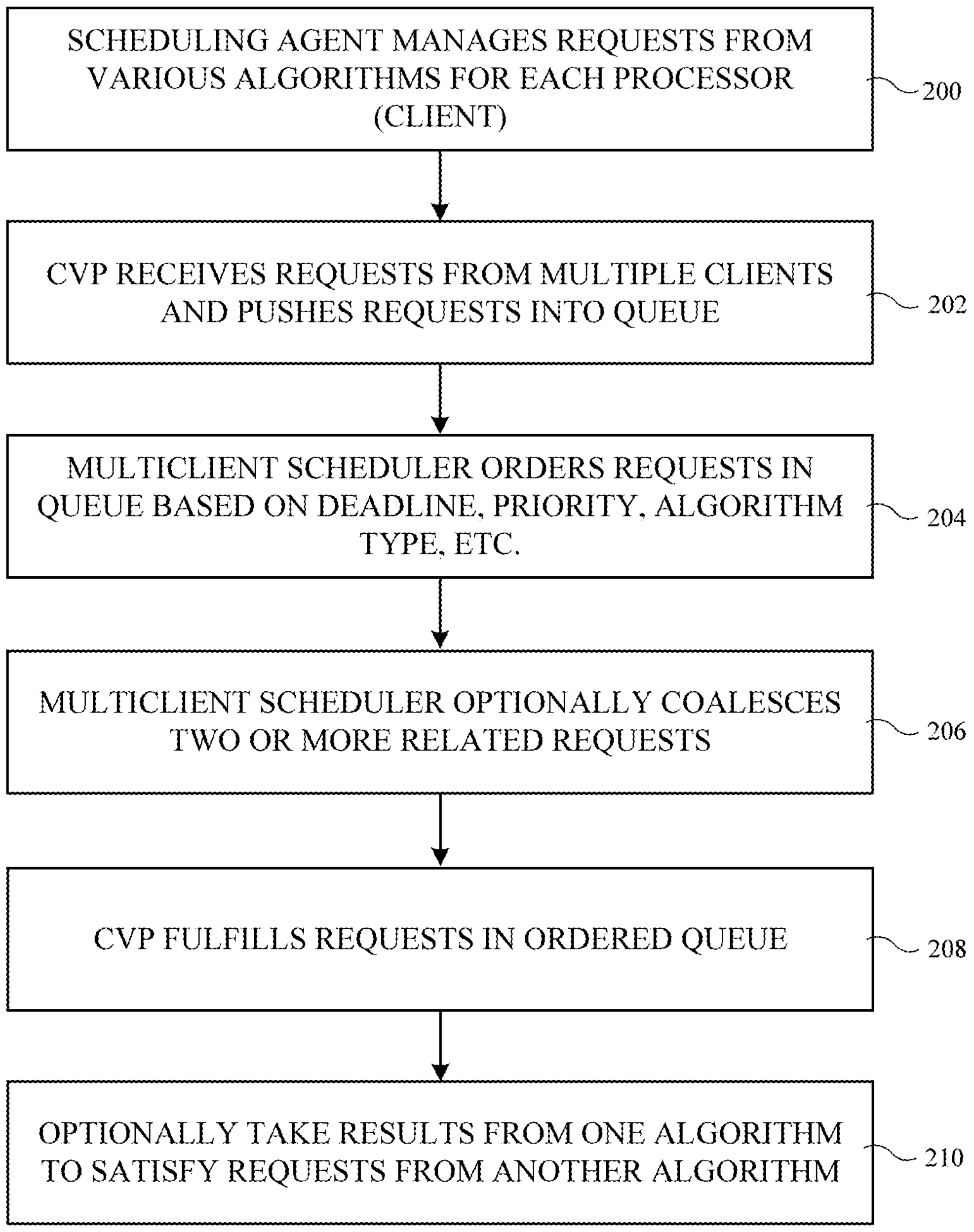
FIG. 6 is a flow chart of illustrative steps for operating subsystems of the type shown in FIG. 3 in accordance with some embodiments.

FIG. 6 is a flow chart of illustrative steps for operating subsystems of the type described in connection with FIGS. 3-5. During the operations of block 200, the scheduling agent 84 within each client processor 80 can locally manage requests received from the various algorithms 82. Scheduler 84 may analyze one or more compute graphs associated with algorithms 82 can determine an optimized schedule for the requested tasks.

During the operations of block 202, the CVP circuitry 60 can receive client requests from one or more processors 80. The various processors 80 can independently send client requests to client interface 90. For example, client interface 90 can receive requests from multiple scheduling agents 84 in parallel. Client requests received at interface 90 can be pushed into scheduler queue 94.

During the operations of block 204, multiclient scheduler 92 may order the requests in queue 94 based on deadlines, priority levels, algorithm type, and/or other parameters. As an example, requests with more imminent deadlines may be pushed to the front of the queue, whereas requests with later deadlines may be pushed to the back of the queue. As another example, requests flagged with a higher priority level may be pushed to the front of the queue, whereas requests flagged with a lower priority level or without any priority flag may be pushed to the back of the queue. As another example, requests associated with user-facing algorithms may be considered higher priority and pushed to the front of the queue, whereas background algorithms that are non-user-facing may be considered lower priority and pushed to the back of the queue. User-facing algorithms may include algorithms for displaying a magnified version of one or more objects within the user's field of view (e.g., to increase readability of small text). User facing algorithms might also include algorithms involved with tracking the user's gaze (e.g., to track when the user's gaze is aligned with one or more user interface elements being displayed by device 10).

During the operations of block 206, multiclient scheduler 92 may optionally coalesce, consolidate, or merge two or more related requests. For example, consider a scenario in which CVP circuitry 60 receives three different image capture requests, where the first request requires an image at full (highest) resolution, where the second request requires a lower resolution image with 2×2 pixel binning, and wherein the third request requires an even lower resolution image with 4×4 pixel binning. Here, the multiclient scheduler 92 can determine that a single image capture at the highest (full) resolution is sufficient to satisfy all three requests. For instance, multiclient scheduler 92 can employ a pyramid scaler that is part of the front-end image signal processing circuitry for downscaling the full-resolution image (e.g., via 2×2 binning) to satisfy the second request and for downscaling the full-resolution image (e.g., via 4×4 binning) to satisfy the third request.

During the operations of block 208, CVP circuitry 60 can fulfill the requests in queue 94 in accordance with the order determined from block 204. Multiclient scheduler 92 can fulfill the requests in the queue based on a best effort approach. If multiclient scheduler 92 is not able to complete all of the required tasks before the specified deadlines, scheduler 92 may send (via client interface 90) a negative acknowledgement back to the corresponding client processor 80 so that the processor is aware that one or more requests have not fulfilled before the specified deadline. Multiclient scheduler 92 can also optionally discard low priority requests if it does not have sufficient bandwidth to fulfill all of the requests in time.

During the operations of block 210, multiclient scheduler 92 can optionally take results from one algorithm or client to satisfy the request from another algorithm or client. For example, consider a scenario in which CVP circuitry 60 is currently fulfilling a streaming request for a user-facing algorithm. Such streaming request may acquire a series of images. During this streaming, the CVP circuitry 60 might receive a one-shot capture request from another algorithm that only needs a single image for contextual computer vision processing. In such situations, multiclient scheduler 92 can take a selected image frame from the series of streaming images and pass the selected image to the CVP algorithm to satisfy the one-shot capture request. If desired, multiclient scheduler 92 can optionally employ a pyramid scaler to downscale the resolution of one or more images being passed to a downstream algorithm for computer vision consumption while the images being presented to the displays for human consumption remains at the full (highest quality) resolution.

The operations of FIG. 6 are illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 7:
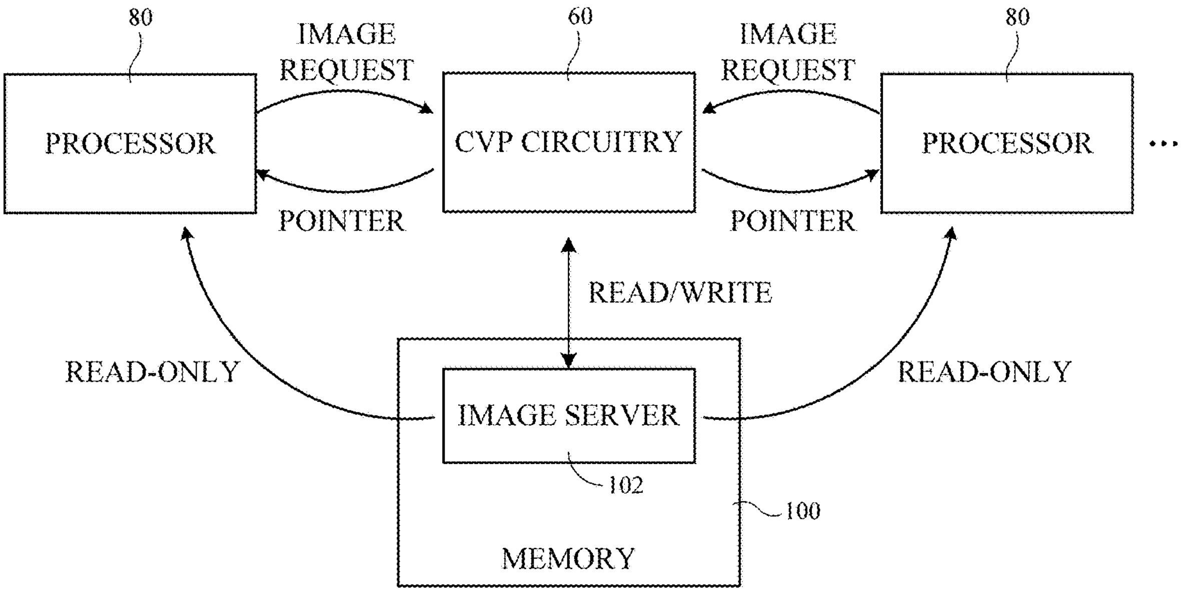
FIG. 7 is a diagram showing illustrative computer vision processing (CVP) circuitry and multiple processors coupled to a shared image server in accordance with some embodiments.

Computer vision processing circuitry 60 may keep track of recent image captures and can optionally respond to client requests from processors 80 using one of more of the recent image captures if certain requirements are met without having to trigger a new capture. FIG. 7 is a diagram showing how CVP circuitry 60 and the client processors 80 can be coupled to shared image 100. As shown in FIG. 7, image server 102 having a repository of recently captured images and/or historical captured images can be stored on memory 100. Image server 102, sometimes referred to as an image database or image repository, may be accessible to CVP circuitry 60 and to the various client processors 80. The CVP circuitry 60 may have read and write privileges to the image sever 102 (e.g., the computer vision processing CPU 70 can, in addition to retrieving data from image server 102, update or add an entry in image server 102). In contrast, the client processors 80 might have read-only privileges to the image server 102 (e.g., each processor 80 can only retrieve data from image server 80). Each processor 80 may issue an image request to CVP circuitry 60. In response to receiving the image request, CVP circuitry 60 may return a pointer (e.g., a memory pointer) to the requesting processor 80, and processor 80 can use that pointer to retrieve a corresponding image from server 102.

Figure 8:
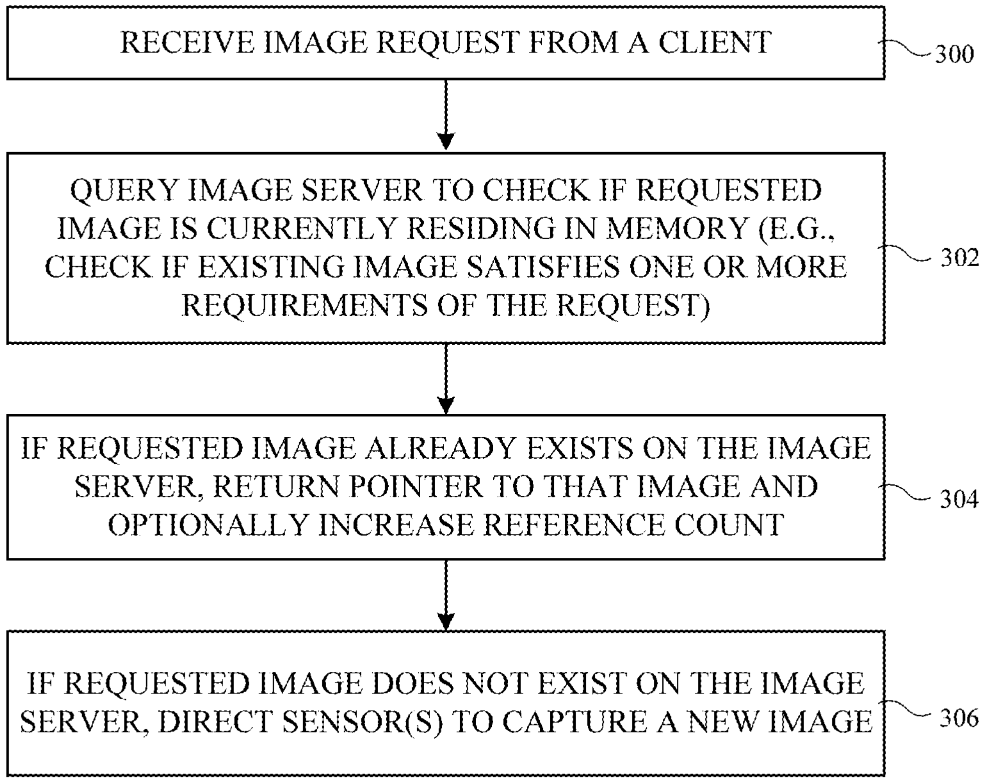
FIG. 8 is a flow chart of illustrative steps for operating subsystems of the type shown in FIG. 7 in accordance with some embodiments.

FIG. 8 is a flow chart of illustrative steps for operating subsystems of the type described in connection with at least FIGS. 3 and 7. During the operations of block 300, CVP circuitry 60 may receive an image request from a client processor 80. The image request is a request for an image that satisfies certain requirements and is sometimes referred to as a client request. During block 300, CVP circuitry 60 can simultaneously receive client requests from multiple processors 80.

During the operations of block 302, CVP circuitry 60 query image server 102 to check if the requested image is currently residing on the image server 102. The CVP circuitry 60 may check if an existing image on server 102 meets one or more of the requirements of the image request. As an example, an image request might request a well-exposed image that is captured within the past 5 seconds using an outward-facing camera 50 (FIG. 2) having a wide field of view at full resolution. The CVP circuitry 60 can determine whether such image already exists on server 102 (e.g., by checking if a given image is sufficiently bright, if the given image was captured using a wide-angle camera 50, if the given image was captured within the past 5 seconds, and if the given image was captured at the highest resolution) and if so, return to the requesting client 80 a pointer to that image without having to trigger a new image capture. Handling client requests in this way can be technically advantageous and beneficial to avoid having to capture a new image frame and can minimize power consumption for device 10.

The example above where the image request lists requirements relating to exposure level, resolution, timing, and camera type is illustrative. As another example, the image request can specify a timing deadline (e.g., a point in time by which a requested image must be returned to the client). As another example, the image request can specify a point in time in the past within which the image should have been captured. As another example, the image request can specify a point in time in the future within which the image will have been captured. As another example, the image request can specify a minimum signal to noise ratio (SNR) for the image. As another example, the image request can specify a maximum amount of motion blur that can be tolerated. As another example, the image request can specify a number of consecutive frames that need to be captured. As another example, the image request can specify a type of frames that need to be captured. As another example, the image request can specify a number of bracketed frames with an array of EV (exposure value) stops that need to be captured.

These example requirements or parameters are illustrative. In some situations, all of the specified requirements in the request must be met. In some situations, only a subset of the specified requirements of the request must be must. If desired, at least some of the specified requirements can optionally be relaxed. For instance, a slightly underexposed image that otherwise meets all other requirements may be considered a sufficient match. As another example, an image that was captured 6 seconds ago might violate a requirement that the image be captured within the past 5 seconds but that otherwise meets all other requirements may be considered a sufficient match.

During the operations of block 304, if CVP circuitry 60 determines that the requested image already exists on the image server 102 (e.g., if circuitry 60 identifies an existing image on server 102 sufficiently satisfying the specified requirements), then CVP circuitry 60 can return a pointer or an image identifier to that image and optionally increment a reference count for that image. The reference count may serve to hold that image for the client. If the client no longer needs that image, CVP circuitry 60 can decrement or reset the reference count to release the image. A released image can be deleted from image server 102 within a specified period of time to clear space for new images.

During the operations of block 306, if CVP circuitry 60 determines that the requested image does not exist on the image server 102 (e.g., if circuitry 60 does not find a match), CVP circuitry 60 can direct one or more corresponding sensor(s) on device 10 to capture one or more new images to satisfy the client request. Although FIG. 8 shows block 306 as occurring after block 304, only the operations of one of blocks 304 and 306 is performed for any given client image request. Thus, if the operations of block 304 is being performed, the operations of block 306 can be skipped. Conversely, if the operations of block 306 is being performed, the operations of block 304 can be skipped.

The operations of FIG. 8 are merely illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The foregoing is merely illustrative and various modifications can be made to the described embodiments. The foregoing embodiments may be implemented individually or in any combination.

What is claimed is:

1. A method of operating an electronic device, comprising:
- with at least one client running on the electronic device, outputting image requests;
- with a multiclient scheduler, receiving the image requests from the at least one client and feeding the image requests into a queue;
- with the multiclient scheduler, reordering at least some of the image requests in the queue;
- fulfilling at least some of the image requests in the queue by directing one or more image sensors in the electronic device to capture an image;
- with the multiclient scheduler, determining whether at least two of the received image requests can be satisfied by a single image capture; and
- in response to determining that the at least two of the received image requests can be satisfied by the single image capture, coalescing the at least two of the received image requests into a single image request.

2. The method of claim 1, wherein reordering at least some of the image requests in the queue comprises reordering at least some of the image requests in the queue based on deadlines or timing requirements specified in the image requests.

3. The method of claim 1, wherein reordering at least some of the image requests in the queue comprises reordering at least some of the image requests in the queue based on priority levels associated with the image requests.

4. The method of claim 1, further comprising:
- with the at least one client, running a first set of algorithms including a gaze tracking algorithm; and
- with an additional client running on the electronic device or on an additional electronic device separate from the electronic device, running a second set of algorithms different than the first set of algorithms.

5. The method of claim 4, further comprising:
- with a first scheduling agent running on the at least one client, managing first requests output from the first set of algorithms; and
- with a second scheduling agent running on the additional client, managing second requests output from the second set of algorithms.

6. The method of claim 1, wherein reordering the at least some of the image requests in the queue comprises reordering the at least some of the image requests in the queue based on whether the image requests are associated with a user-facing algorithm or a non-user-facing algorithm.

7. The method of claim 1, further comprising:
- with the multiclient scheduler, returning a result corresponding to the image to the at least one client; and
- with the multiclient scheduler, returning the result to an additional client, different than the at least one client, without triggering another image capture.

8. The method of claim 7, wherein returning the result to the at least one client comprises returning the result with a first resolution to the at least one client, and wherein returning the result to the additional client without triggering another image capture further comprises returning the result with a second resolution, different than the first resolution, to the additional client.

9. A method of operating an electronic device, comprising:
- with at least one client running on the electronic device, outputting image requests;
- with a multiclient scheduler, receiving the image requests from the at least one client and feeding the image requests into a queue;
- with the multiclient scheduler, reordering at least some of the image requests in the queue;
- fulfilling at least some of the image requests in the queue by directing one or more image sensors in the electronic device to capture an image;
- with the at least one client, running a first set of algorithms including a gaze tracking algorithm; and
- with an additional client running on the electronic device or on an additional electronic device separate from the electronic device, running a second set of algorithms different than the first set of algorithms.

10. The method of claim 9, further comprising:
- with a first scheduling agent running on the at least one client, managing first requests output from the first set of algorithms; and
- with a second scheduling agent running on the additional client, managing second requests output from the second set of algorithms.

11. The method of claim 9, wherein reordering the at least some of the image requests in the queue comprises reordering the at least some of the image requests in the queue based on whether the image requests are associated with a user-facing algorithm or a non-user-facing algorithm.

12. The method of claim 9, further comprising:
- with the multiclient scheduler, returning a result corresponding to the image to the at least one client; and
- with the multiclient scheduler, returning the result to the additional client without triggering another image capture.

13. The method of claim 12, wherein returning the result to the at least one client comprises returning the result with a first resolution to the at least one client, and wherein returning the result to the additional client without triggering another image capture further comprises returning the result with a second resolution, different than the first resolution, to the additional client.

14. A method of operating an electronic device, comprising:
- with at least one client running on the electronic device, outputting image requests;
- with a multiclient scheduler, receiving the image requests from the at least one client and feeding the image requests into a queue;
- with the multiclient scheduler, reordering at least some of the image requests in the queue, wherein reordering at least some of the image requests in the queue comprises reordering at least some of the image requests in the queue based on whether the image requests are associated with a user-facing algorithm or a non-user-facing algorithm; and
- fulfilling at least some of the image requests in the queue by directing one or more image sensors in the electronic device to capture an image.

15. The method of claim 14, further comprising:
- with the multiclient scheduler, returning a result corresponding to the image to the at least one client; and
- with the multiclient scheduler, returning the result to an additional client, different than the at least one client, without triggering another image capture.

16. The method of claim 15, wherein returning the result to the at least one client comprises returning the result with a first resolution to the at least one client, and wherein returning the result to the additional client without triggering another image capture further comprises returning the result with a second resolution, different than the first resolution, to the additional client.

17. A method of operating an electronic device, comprising:
- with at least one client running on the electronic device, outputting image requests;
- with a multiclient scheduler, receiving the image requests from the at least one client and feeding the image requests into a queue;
- with the multiclient scheduler, reordering at least some of the image requests in the queue;
- fulfilling at least some of the image requests in the queue by directing one or more image sensors in the electronic device to capture an image;
- with the multiclient scheduler, returning a result corresponding to the image to the at least one client; and
- with the multiclient scheduler, returning the result to an additional client, different than the at least one client, without triggering another image capture.

18. The method of claim 17, wherein returning the result to the at least one client comprises returning the result with a first resolution to the at least one client, and wherein returning the result to the additional client without triggering another image capture further comprises returning the result with a second resolution, different than the first resolution, to the additional client.

19. A method of operating an electronic device having one or more sensors, the method comprising:
- executing one or more clients on the electronic device;
- with a multiclient scheduler coupled to the one or more clients, receiving an image request from a client in the one or more clients;
- determining whether the image request can be satisfied by an existing image currently stored on an image server within the electronic device before triggering the one or more sensors to capture a new image;
- in response to determining that the image request can be satisfied by an existing image currently stored on the image server, returning a pointer to the existing image to the client; and in response to determining that the image request cannot be satisfied by an existing image currently stored on the image server, triggering the one or more sensors to capture a new image.

20. The method of claim 19, further comprising:

in response to determining that the image request can be satisfied by an existing image currently stored on the image server, increasing a reference count for the existing image.

21. The method of claim 19, wherein the received image request comprises requirements that specify one or more of: a timing or deadline requirement, an image resolution, an exposure level, a camera type, and a number of consecutive frames to capture.

22. The method of claim 21, wherein determining whether the image request can be satisfied by an existing image currently stored on the image server comprises determining whether an existing image satisfies at least some of the requirements specified in the received image request.

23. The method of claim 21, wherein determining whether the image request can be satisfied by an existing image currently stored on the image server comprises relaxing at least some of the requirements specified in the received image request for an existing image.

* * * * *